United States Patent
Link et al.

(10) Patent No.: US 6,199,391 B1
(45) Date of Patent: Mar. 13, 2001

(54) MAGNETIC CLUTCH METHOD AND APPARATUS FOR DRIVING A VEHICLE AIR CONDITIONER

(75) Inventors: Larry Ray Link, Frankfort, IL (US); John Scott Foresman, Grand Rapids, MI (US)

(73) Assignee: American Cooling Systems, LLC, Grand Rapids, MI (US)

( * ) Notice: Subject to any disclaimer, the term of this patent is extended or adjusted under 35 U.S.C. 154(b) by 0 days.

(21) Appl. No.: 09/366,946

(22) Filed: Aug. 4, 1999

Related U.S. Application Data

(63) Continuation-in-part of application No. 08/920,569, filed on Aug. 29, 1997, now Pat. No. 5,947,248.
(60) Provisional application No. 60/095,750, filed on Aug. 7, 1998.

(51) Int. Cl.[7] .............................. B60H 1/32; F16D 27/00
(52) U.S. Cl. .............................. 62/133; 62/243; 310/95; 192/84.31
(58) Field of Search .......................... 62/133, 243, 323.1, 62/323.4; 310/92, 94, 95; 192/40, 56.4, 84.1, 84.31

(56) References Cited

U.S. PATENT DOCUMENTS

| | | |
|---|---|---|
| 1,548,016 | 7/1925 | La Riboisiere . |
| 3,552,351 | 1/1971 | Willem et al. . |
| 3,603,105 | * 9/1971 | Figa ........................................ 62/133 |
| 3,751,181 | 8/1973 | Hayashi . |
| 3,826,937 | 7/1974 | Davies . |
| 3,883,633 | 5/1975 | Kohler . |
| 3,924,585 | 12/1975 | Woods . |
| 3,932,068 | 1/1976 | Zimmerman . |
| 4,095,922 | 6/1978 | Farr . |
| 4,119,184 | 10/1978 | Mower et al. . |
| 4,152,099 | 5/1979 | Bingler . |
| 4,176,630 | 12/1979 | Elmer . |
| 4,189,654 | 2/1980 | Mourier ................................. 310/72 |
| 4,509,091 | 4/1985 | Booth . |
| 4,554,491 | 11/1985 | Plunkett . |
| 4,651,922 | 3/1987 | Noba . |
| 4,671,739 | 6/1987 | Read et al. . |
| 4,760,898 | 8/1988 | Nyquist . |
| 4,896,064 | 1/1990 | Taiani . |
| 5,045,739 | 9/1991 | Kuwahara . |
| 5,053,666 | 10/1991 | Kliman et al. ......................... 310/261 |

(List continued on next page.)

FOREIGN PATENT DOCUMENTS

| | | |
|---|---|---|
| 0 730 337 | 9/1996 | (EP) . |
| 0 899 858 | 3/1999 | (EP) . |
| 2 278 242 | 11/1994 | (GB) . |
| WO 93/24986 | 12/1993 | (WO) . |

*Primary Examiner*—Harry B. Tanner
(74) *Attorney, Agent, or Firm*—Fitch, Even, Tabin & Flannery

(57) ABSTRACT

A drive for the compressor of a vehicle air conditioner has a magnetic clutch for mechanically driving the compressor shaft within a predetermined range of torque and a rotatable input element on the magnetic clutch to be rotated by the vehicle motor at varying speeds with changes in the vehicle motor's speed. The drive includes a first electromagnetic element on the rotatable input element and a compressor shaft on the output side of the magnetic clutch for supplying torque to drive the compressor. Also, there is a second electromagnetic element on the compressor shaft with a magnetic field between the first and second electromagnetic elements to rotate the compressor. An electric control is provided for varying the electrical power to the electromagnetic clutch as the vehicle motor changes speed to vary the magnetic field and torque being applied to rotate the compressor shaft.

15 Claims, 3 Drawing Sheets

U.S. PATENT DOCUMENTS

| | | | |
|---|---|---|---|
| 5,273,143 | 12/1993 | Voss et al. | 192/3.58 |
| 5,307,644 | 5/1994 | Cummins et al. | 62/133 |
| 5,469,947 * | 11/1995 | Anzai et al. | 62/133 X |
| 5,548,173 | 8/1996 | Stephenson | 310/181 |
| 5,565,723 | 10/1996 | Dastidar | 310/103 |
| 5,566,745 | 10/1996 | Hill et al. | |
| 5,598,705 | 2/1997 | Uzkan | |
| 5,687,823 | 11/1997 | Nakagawa et al. | |
| 5,724,941 | 3/1998 | Suzuki et al. | |
| 5,763,969 | 6/1998 | Metheny et al. | |
| 5,775,115 * | 7/1998 | Lutz et al. | 62/323.4 X |
| 5,893,272 * | 4/1999 | Hanselmann et al. | 62/133 |
| 5,900,203 | 5/1999 | Needham et al. | |

* cited by examiner

MAGNETIC CLUTCH METHOD AND APPARATUS FOR DRIVING A VEHICLE AIR CONDITIONER

FIELD OF THE INVENTION

This application claims the benefit of U.S. application Ser. No. 60/095,750, filed Aug. 7, 1998, entitled "Magnetic Clutch Method and Apparatus For Driving a Vehicle Air Conditioner", which, in turn, is a Continuation-In-Part of U.S. application Ser. No. 08/920,569, filed Aug. 29, 1997, U.S. Pat. No. 5,947,248 entitled "Electric Fan Clutch".

BACKGROUND OF THE INVENTION

Vehicles such as automobiles have an air conditioner system for cooling a vehicle passenger. The air conditioner includes a compressor unit that is driven by the vehicle motor. The air conditioner drive for the compressor requires a substantial amount of power. There are instances where it is desired to limit the amount of power used to drive the air conditioner compressor, such as to conserve fuel or power. Where the vehicle is being powered by an electric motor, there is a particular need to conserve power being drained from the battery to run the air conditioner. This becomes more acute at higher motor speeds. In order to conserve power, it is desired to drive the air conditioner compressor at a relatively constant speed even though the vehicle's electric motor speed is being varied substantially, such as when accelerating the vehicle, traveling in heavy traffic, etc.

SUMMARY OF THE INVENTION

In accordance with the present invention, there is an overall vehicle air conditioning system which allows better and tighter modulation control of the amount of torque transferred to the air conditioner compressor. This is achieved by the use of a magnetic clutch that receives driving input from the vehicle motor and the current or power to magnetic clutch is varied as the motor speed varies to modulate the torque supplied to the air conditioner. Preferably, the motor speed is sensed, and this and/or other sensed inputs are sent to controller which modulates the voltage quickly and incrementally to the magnetic clutch to modulate the magnetic flux field to keep it relatively constant and thereby keep the torque output from the magnetic clutch at a relatively constant value. The preferred magnetic clutch is unlike many clutches that are either fully engaged or fully disengaged in that it can be partially engaged as well as fully engaged or disengaged. The magnetic field can be modulated, i.e., have a controlled slip to transfer only a percentage of the torque, in order to provide a relatively constant output torque even though the electric motor speed is increasing substantially as is the speed of the input member of the magnetic clutch which is usually directly driven by the electric motor through a belt or gear drive.

In accordance with an important aspect of the invention, at high current, there is substantial slippage with the clutch driving element being rotated much faster than the clutch driven element which is connected to the air conditioner compressor. The magnetic clutch has a magnetic field between the electromagnets and the pole pieces and the magnetic field is kept relatively constant by electronic control to prevent higher current being inputted to the electromagnets when the motor speed increases.

In accordance with a further aspect of the invention, an electrical generator for supplying power to the magnetic clutch is incorporated into the magnetic clutch to supply electrical current to the electromagnets in the magnetic clutch. The electrical current from the electrical generator is modulated in a controlled manner by a computer controlled circuit for supplying electrical current to the magnetic clutch. Preferably, both the generator and the magnetic clutch are directly mounted on the A.C. compressor shaft and have a common rotatable input member driven by the vehicle electric motor. The use of a generator permits a non-contact application of power to the rotating pulley portion of the magnetic clutch, thereby avoiding the use of slip rings, brushes, or the like. Further, a rectifier rectifies the AC current generated into DC current for the electromagnetic clutch and a pulsing circuit is used to pulse the electromagnets of the clutch.

DESCRIPTION OF PREFERRED EMBODIMENT

Figure 1:
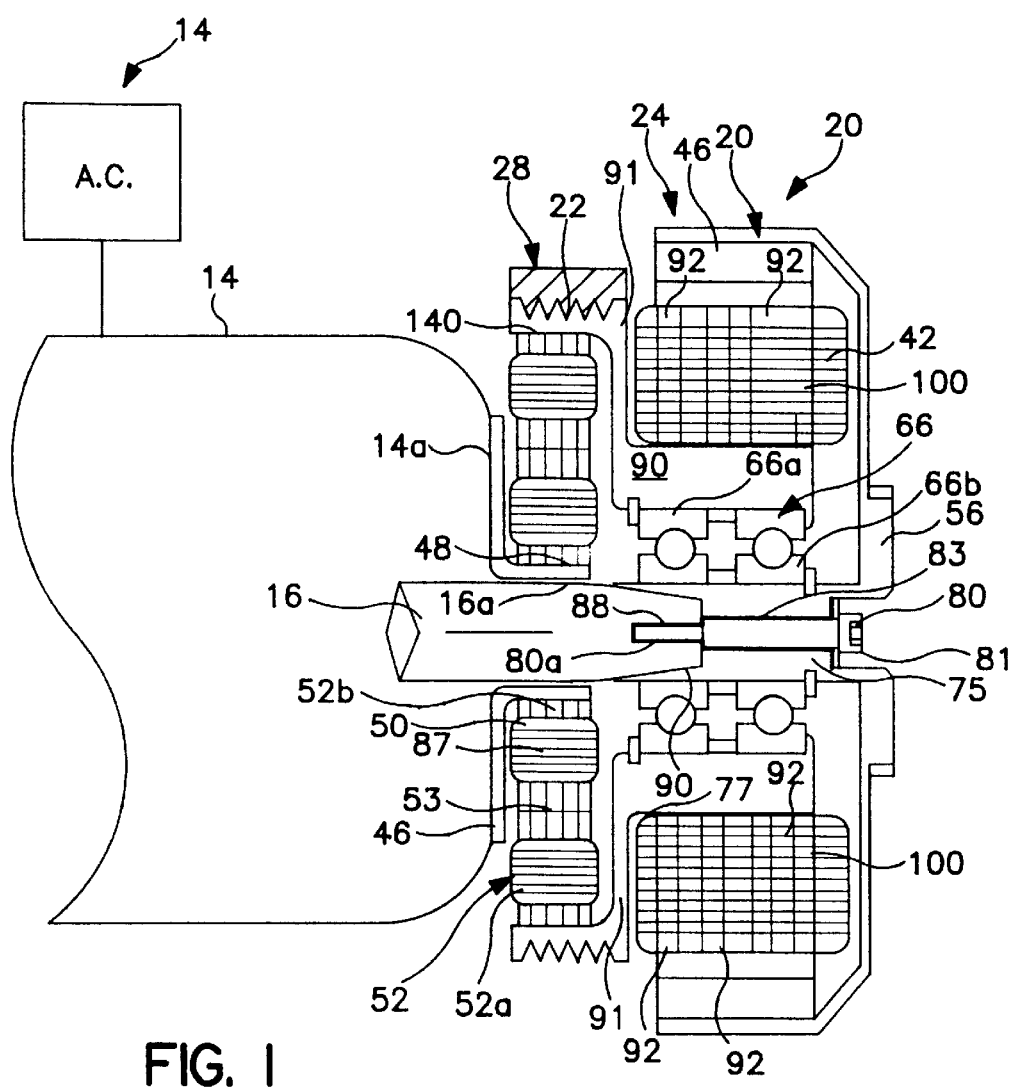
FIG. 1 is a partially sectioned view of the magnetic clutch and generator constructed in accordance with the invention.

As shown in the drawings for purposes of illustration, the invention is embodied in a vehicle 10 having an air conditioning system 12 that includes a compressor 14. The compressor has an input element in the form of a rotatable shaft 16 which is driven to operate the condenser. The illustrated vehicle is driven by an electric motor 18 which receives electrical power from a battery on the vehicle.

For a number of reasons, it may be desired to maintain a particular torque or torque range to the compressor input shaft 17 despite varying conditions and needs for air conditioning. When the drive shaft 16 is connected through a mechanical clutch, it is usually fully engaged to be driven directly by the motor. As the motor speed increases, the output torque to the fully engaged clutch is increased, resulting in a greater portion of the motor's power being used to run the air conditioner. This is particularly disadvantageous where an electric motor is used to supply the power. Current electric motors in vehicles have relatively stringent power requirements and it is desired to use a fixed displacement compressor 16 because it is quieter, small and cheaper than a variable displacement compressor (not shown).

Figure 2:
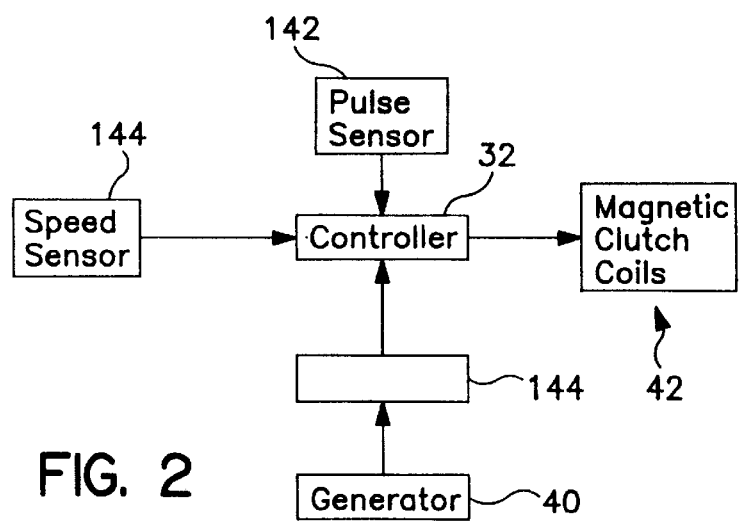
FIG. 2 is a block diagram of a control system for the magnetic clutch and generator of FIG. 1.

There is provided an new and improved air conditioning system which allows a tighter or modulated control of torque transferred to drive the air conditioner compressor 14. This is achieved by the use of a magnetic clutch 20 that receives a driving input from the vehicle motor through a pulley or driving member 22, which is magnetically clutched by a magnetic field to an output driven member 24 which is fastened to the compressor shaft 16 of the compressor. Turning of the shaft 16 operates the air conditioning compressor to compress refrigerant in a conventional manner. The magnetic clutch is able to modulate or control the amount of magnetic field used between a very small or no power with the clutch and pulley element 22 being freewheeling and decoupled from the driven member 20 to a full torque operation where substantially 100% of the input torque from a belt 28 is used to drive the pulley 22. The magnetic clutch is able to modulate the torque supplied by the clutch to the compressor 14 and it is possible to provide a substantially constant amount of torque to the compressor 14 even though the speed of the motor is varied substantially and may be operating at full speed most of the time. Preferably, a condition such as motor speed is sensed by a sensor 30 (FIG. 2) which supplies an input to a controller 32 which modulates the voltage quickly to the magnetic clutch 20 to keep the magnetic flux field at the desired torque level, for example, a substantially constant value of torque, to turn the compressor at a relatively constant speed even though the engine speed may be varying substantially.

As explained in the co-pending application, Ser. No. 08/920,569, filed Aug. 29, 1997, entitled "Electric Fan Clutch", which is hereby incorporated by reference as if fully reproduced herein, there can be a substantial amount of slippage between the driving pulley 22 which can be rotated at a much faster speed such as engine speed than the driven element 24 and the compressor shaft 16 because of this slippage or the modulation at the clutch. By sensing and modulating the speed and sending signals to the controller, the controller 32 can provide an output to the magnetic clutch to keep the magnetic clutch at a relatively constant torque, even though the vehicle may be accelerating and a higher torque and faster speed are being applied to the input pulley 22.

In accordance with a further aspect of the invention and in accordance with the embodiment of the invention shown in FIG. 1, the clutch is also provided with an electrical generator 40 which converts the mechanical energy of the spinning pulley 22 into electrical energy which is used to energize the electromagnets 42 which are carried on the rotating pulley 22 for cooperation with other magnetic field elements 46 (preferably steel bars or targets) which are carried on the rotating driven element 24. The preferred and illustrated driven magnetic field elements 46 are preferably in the form of steel bars, as will be explained in greater detail hereinafter. As will be in seen in FIG. 2, the generator 40 and sensor 30 provide inputs to the controller 32 which controls the timing and the amount of electrical power being supplied to the magnetic clutch 20 to control the torque output being applied to the compressor shaft despite the widely varying input torque from the belt 22 with vast changes in acceleration speed of the vehicle and its driving electric motor. Preferably, the controller 32 pulses the electrical energy into the coils of the clutch electromagnets 42, at intervals controlled by a position sensor in order to maximize dynamic torque.

Turning now in greater detail to the embodiment of the invention illustrated in FIG. 1, the generator 40 is mounted by a generator mounting bracket 46 having a depending leg 47 fixed to a vertical side 14*a* of the compressor and having a short, horizontal supporting leg 48 adjacent and about the compressor shaft 16. As will be explained in greater detail hereinafter, the generator comprises an inner set of stationary electromagnets 50 and an outer set of electromagnets 52 which are separated from each other by an air gap 53. The outer set of coils or electromagnets 52 are mounted and rotate with the pulley element 22 as it is driven by the belt 28. Thus, the pulley's driving belt 28 supplies the mechanical rotating power to rotate the pulley in accordance with the vehicle motor speed and provide a variable speed rotation of the rotating outer coil set 52 mounted on the pulley. The clutch coils 42 are likewise mounted on the belt driven pulley 22 and generate a magnetic field across to the magnetic elements 46 which are secured to an inner side or portion of the rotating driven clutch element 20, which is in the form of a cover and which hereinafter will be referred to as a "cover 20". The cover 20 has a central integral hub portion 56 which is connected to the compressor shaft to rotate the same.

Figure 3:
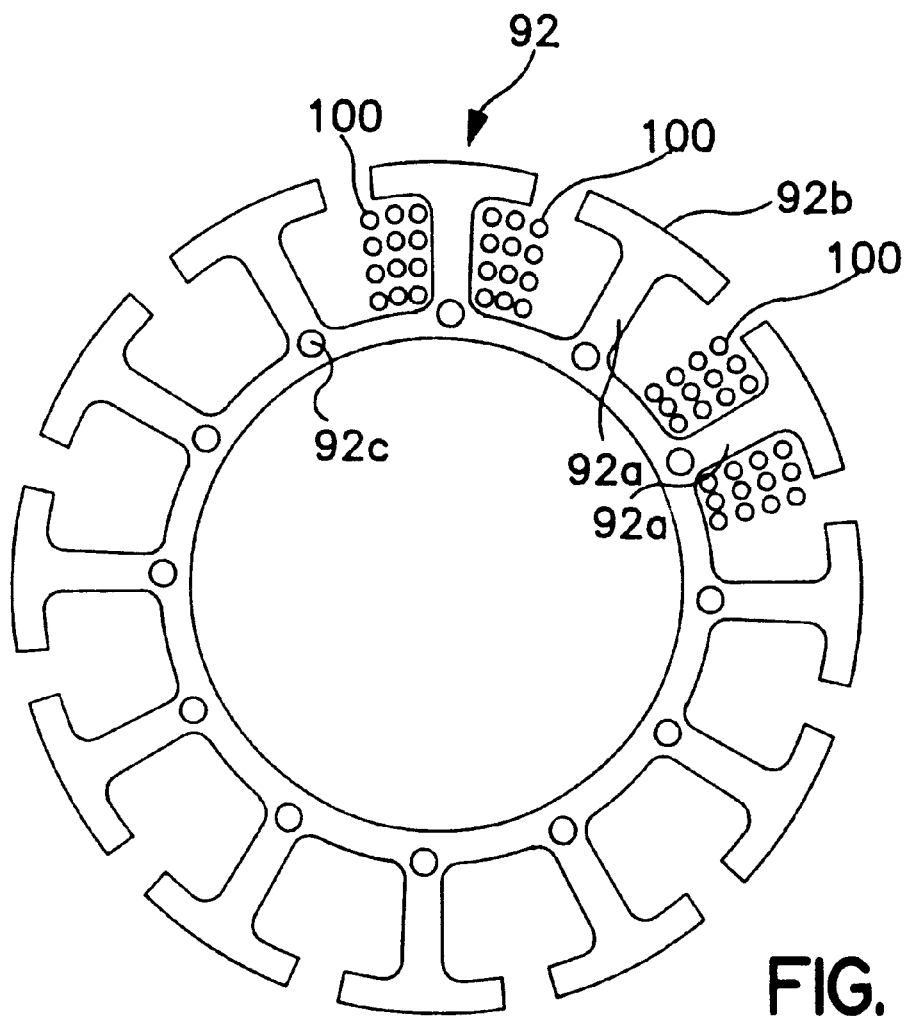
FIG. 3 is a plan view of a ring having pole pieces and pole faces for the magnetic coils.

Referring now in greater detail to the cover 20, as best seen in FIG. 3, the cover 20 has an outer annular portion 60 which is preferably molded of a plastic with rectangular shaped steel targets or bars 46. The steel bars 46 are molded in situ to be equally spaced in about twelve locations, for example, about the periphery of the cover 20 adjacent the outer plastic rim portion 61 which rotates when driven by the magnetic field coupled across the air gap 64 between the coils 42 and the magnetizable bars 46. Preferably there is one coil 42 which is an electromagnetic coil for alignment with each of the respective steel bars 46. The illustrated bars 46 are preferably made of 1008/1010 steel; but they could be made of other materials and shapes.

In the embodiment shown in FIG. 1, a common set of roller bearings 66 mounts both the cover 20 for rotation and the pulley 22 for rotation, with the pulley 22 being connected to a bearing outer race 66*a*. The cover hub 56 mounted the bearing and carries the inner race 66*b* for rotation with the hub.

In the embodiment shown in FIG. 1, the integral central hub portion 56 of the rotatable cover 20 has a cylindrical shaft 75 carrying the inner bearing race 66*b*. The shaft 76 has a cone-shaped seat 77 located to receive an inclined tapered end 16*a* of the compressor shaft 16. A connecting installation bolt 80 has a head and washer 81 at the end of the hub 56 and extends through an internal bore 83 in the cylindrical shaft 76 with a threaded end 80*a* of the bolt being threaded in a threaded aperture 88 in the end of the compressor shaft end 16*a*.

Turning now to the electromagnetic coils 42 which are mounted on the pulley member 22, the pulley includes a plastic central hub 90 with a radially extending collar or flange 91 to which are bolted a series of metal plates 92. The plates 92 have a series of coil wires 100 wound thereon to form the electromagnet 42 to produce the electromagnetic field with the magnetic elements 46. The preferred plates 92 are made of 1008/1010 steel. These plates 92 are bolted by bolts (not shown) to the rotating pulley flange 91. The plates 92 have a small diameter central opening to fit over the plastic hub 90 of the pulley 22. These plates 92 are typically made of a magnetizable material having good magnetic properties and which is preferably of a low cost material, a good steel has been found to be 1008/1010 steel. The outer ends of the respective plates 92 provide pole faces which are arcuate and which are spaced by an air gap 64 across from the corresponding curved surfaces of the magnetic elements 46.

The preferred magnetic coils for both the magnetic clutch and the generator are made in a similar manner, as will now be described in connection with FIG. 3. A circular series of coils are made by wrapping wire turns 100 about each of central posts 92*a* about the outer periphery of the ring 92. There are 12 posts 92*a* shown on the ring in FIG. 3; and hence, twelve coils are formed on the ring. Each post has an outer head 92*d*, which acts as a pole piece or face to cooperate across an air gap 64 with a steel bar 46 or an opposite coil on the other set of coils in the generator. The central, inner, annular section of the ring has holes 92*c* therein to allow fastening of the ring to its support, such as the pulley 22, cover 24 or stationary bracket.

Figure 4:
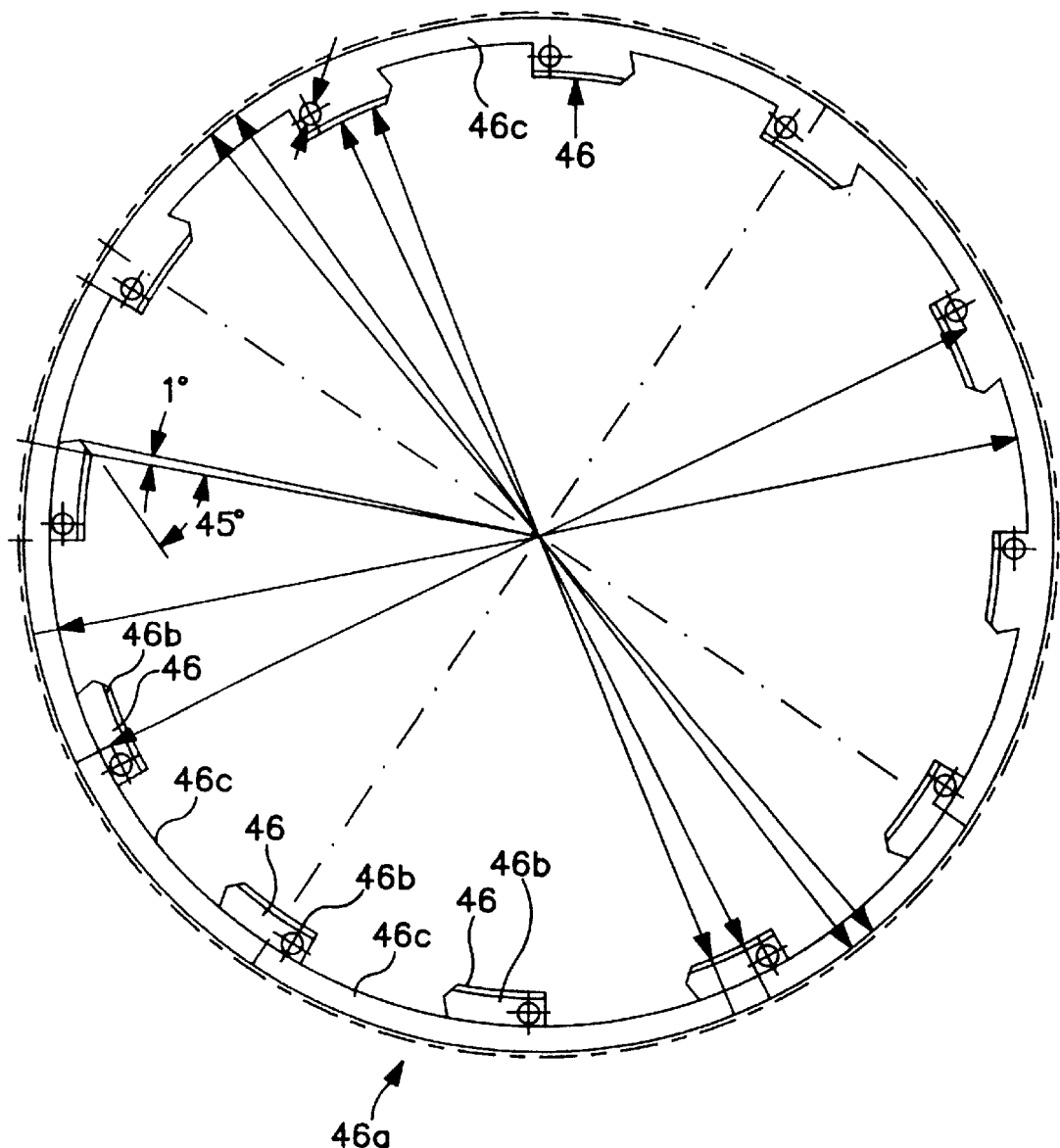
FIG. 4 is a plan view of a ring having 12 spaced magnetic elements called targets or bar which are magnetically attracted by the energized coils.

The preferred magnetic bars 46 are also made from a ring 46*a* (FIG. 4) with an outer peripheral portion carrying twelve (12) magnetic bars 46 in the form of spaced bars or targets having faces 46*b,* which are separated by an air gap 64 from the pole faces 92*b* of the electromagnet coils. The magnetic element bars 46 are connected to each other by thin, radially, outerconnecting strips 46*c.* The ring 46*a* could be a solid, one-piece ring; but from an expense standpoint, it is preferred to form a laminated ring with a stack of 0.030" thick steel plates 46*a* of 1008/1010 steel, which are stacked to provide a cumulative thickness of about 2 inches to 2.5 inches. The stacked ring of 0.030 plates 46*a* are fastened together, such as by rivets, to form a one-piece ring. The ring 46 is molded in situ in the plastic cover when it is molded.

Thus, it will be seen that as the pulley 22 is driven by the belts 28 it rotates its electromagnetic coils 42 to induce a magnetic field across to the steel bar magnetic elements 46, to rotate the cover 20 and the attached compressor shaft 16. When the magnetic field is sufficiently strong enough so that there is no slippage, the driven member 20 and the shaft 16 are rotated at the same speed as the input member 22. On the other hand, if there is no magnetic field established in the electromagnetic coils 42, the motor belt may be rotating the pulley 22 but the disengage or decouple clutch cover 20 will not be turning therewith.

To keep the power constant to the electromagnet coils 46, the sensor 30, a sensor is provided for sensing the speed of the motor and therefore the speed of the drive belt 28 and the pulley 22, which as the car accelerates may experience a fast increase in speed, which if the clutch were an ON/OFF type of clutch with a direct connection, would cause the cover 20 to be rotated and accelerated and would also accelerate the compressor shaft 16 to a high speed rotation. The high-speed coupling requires more torque or horsepower, is wasteful of fuel and of battery life, where the motor driving the vehicle is an electric motor operating off a rechargeable battery.

The generator 40 is provided although it need not be used unless it is desired. That is, the power can come directly from the battery or from the vehicle generator rather than from the generator shown in these figures. The generator's outer coil set 52 may be a large number of coils formed in a manner similar to the coils 42 above described with respect to the magnetic clutch in that they are made with 1008/1010 steel plates 52 with a copper wire 52*b* wound thereabout. There are a number of spaced coils 52 secured to the cylindrical underside 140 of the rim portion of the pulley 22 to rotate at the speed driven by the belt. In this embodiment of the invention, the inner stationary set of generator electromagnetics 53 are made of steel plates 53*a* and a coil of wires 53*b* is wound about the steel plates 53*a* which are secured to the bracket legs 47 and 48 to be stationary mounted on the compressor housing or frame. A trickle current is fed to the electromagnetics 53 and the rotating electromagnets 52 generate a current therein as they pass by the stationary electromagnets. The generator functions in the conventional manner to generate AC power, which is rectified and the rectified current is rectified in a circuit. A pulse sensor 142 (FIG. 2) senses the rotational position of the coils on the pulley 22 relative to the steel bars 46 on the cover and sends a signal to the controller 32 which pulses the DC current into the coils 100 on the pulley. The energized, pulsed coils attract the steel bars 46, generating a torque that rotates the cover and attached compressor shaft secured by bolt 80 to the cover.

From the foregoing it will be seen that there is provided a new and improved magnetic clutch for driving a compressor shaft of an air conditioning unit. Preferably the shaft is of a fixed displacement compressor and is driven at a relatively constant or programmed speed with the clutch slipping and not driving the output element 20 and the compressor at the same speed as the belt and pulley. The controller receives a sensor input with respect to speed or torque from a sensor 144 (FIG. 2) and also preferably receives rectified AC current from the generator 40 and supplies a relatively uniform amount of power to the coils 42, so that the applied torque that is driving the cover element 20 and the compressor shaft 16 are relatively constant to rotate the shaft at a relatively constant speed until the motor is shut off. At shut off there will be no magnetic field from the coils across the air gap to the bar magnets and hence the cover 20 will not be rotated.

The vehicle ECM pulse width modulates 0–2 amps to clutch's built-in generator. The generator converts the mechanical energy of the engine spinning the pulley into the electrical energy necessary to energize the magnets (copper coils). It is estimated that the generator will draw less than 500 watts from the engine. This is estimated to be the power required to energize the magnetic coils in order to produce 35 newton-meters of torque, which is enough torque to spin the compressor at engine speeds from 700–3500 rpm and the respective horsepower draws from 4–16 horsepower. This 500 watts of energy is dissipated as heat from the coils.

What is claimed is:

1. A method of running a vehicle air conditioner comprising:

providing a magnetic clutch for supplying a driving force on its output side to the air conditioner;

driving the input side of the magnetic clutch with mechanical power from the vehicle motor;

varying the speed of the vehicle motor while driving the vehicle to change the mechanical power being applied to the input side of the magnetic clutch; and varying the magnetic field of the magnetic clutch with changes in the engine's speed to maintain within a predetermined range the torque output from the output side of the magnetic clutch to run the air conditioner.

2. A method in accordance with claim 1 including:

modulating the current to magnetic clutch to maintain the output torque from the magnetic clutch at a substantially constant output; and running the air conditioner at a substantially constant speed.

3. A method in accordance with claim 2 including:

using an electric motor to power the vehicle;

sensing the speed of the vehicle electric motor;

modulating the current in accordance with signals from the sensed motor speed; and driving an air conditioning compressor with the magnetic clutch torque output.

4. A method in accordance with claim 1 including:

providing an electrical generator on the magnetic clutch to generate electrical power for the magnet clutch; and supplying generated electrical power after modulation to the magnetic clutch to vary its magnetic field.

5. A drive for a vehicle air conditioner comprising:

an air conditioner having an input member to be mechanically driven;

a magnetic clutch for mechanically driving the input member of the air conditioner within a predetermined range of torque;

a rotatable input element on the magnetic clutch to be rotated by a vehicle motor at varying speeds with changes in the vehicle motor's speed;

a first electromagnetic element on the rotatable drive element;

a rotatable driven member on the output side of magnetic clutch for supplying torque to drive the air conditioner input member;

a second electromagnetic element on the clutch rotatable driven member with a magnetic field between the first and second electromagnetic elements to rotate the driven member; and an electric control for varying the electrical power to the electromagnetic clutch as the vehicle motor changes speed to vary the magnetic field and torque being applied to rotate the rotatable driven member.

6. A drive in accordance with claim 5 wherein a sensor senses the speed of the vehicle motor and provides an input to the electric control to vary the magnetic field substantially with changes in motor speed.

7. A drive in accordance with claim 5 wherein an electromagnetic generator is provided on the magnetic clutch and is driven by the motor and supplies electrical power to generate the magnetic field.

8. A drive in accordance with claim 5 wherein the electrical control comprises a power regulator for regulating the power to electromagnetic element on the magnetic clutch driving element to keep the magnetic field substantially constant despite changes in motor speed and speed of rotation of the rotatable drive element on the magnetic clutch.

9. A drive in accordance with claim 5 wherein the rotatable driven member is mounted on an input shaft of an air conditioner compressor.

10. A vehicle having an air conditioner unit comprising:

an electric motor operable at varying speeds for driving the vehicle at varying speeds;

an air conditioner on the vehicle having a compressor;

a rotatable input to drive compressor for the air conditioner;

a magnetic clutch having input members for receiving a variable speed drive from the vehicle electric motor and having an output member to supply torque to drive the air conditioner;

electromagnets in the magnetic clutch for providing a magnetic force to rotate the clutch output member; and a controller to change the electrical power to the magnetic clutch to change the magnetic field in order to drive the air conditioner within a predetermined speed range which is substantially narrower than a wider varying changes in speed of the vehicle electric motor.

11. A vehicle in accordance with claim 10 wherein an electrical generator is coupled to the magnetic clutch and is driven by the vehicle electric motor to supply electrical power to the control circuit.

12. A vehicle in accordance with claim 10 wherein:

the air conditioner includes a compressor having a rotatable input shaft; and the magnetic clutch output member is connected on the compressor's rotatable input shaft.

13. A vehicle in accordance with claim 10 wherein:

a vehicle condition sensor senses one or more conditions with respect to the vehicle;

the vehicle condition sensor providing inputs to the controller.

14. A vehicle in accordance with claim 13 wherein the vehicle condition sensor comprises a speed sensor for the electric motor.

15. A vehicle in accordance with claim 10 wherein a sensor senses the rotational position of the electromagnets relative to magnetic elements on the driven output member and causes a timed pulsing of power to the electromagnets.

* * * * *